United States Patent
Zhang et al.

(10) Patent No.: US 7,837,498 B2
(45) Date of Patent: Nov. 23, 2010

(54) WIRE DISTRIBUTED 5TH JAW SYSTEM FOR MULTI-POSITION METERING

(75) Inventors: Fan Zhang, Suwanee, GA (US); Brian J. Rusch, Suwanee, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 0 days.

(21) Appl. No.: 12/405,549

(22) Filed: Mar. 17, 2009

(65) Prior Publication Data

US 2009/0247005 A1 Oct. 1, 2009

Related U.S. Application Data

(60) Provisional application No. 61/039,457, filed on Mar. 26, 2008.

(51) Int. Cl.
*H01R 33/945* (2006.01)
(52) U.S. Cl. ..................................................... 439/517
(58) Field of Classification Search .............. 439/660, 439/668–669
See application file for complete search history.

(56) References Cited

U.S. PATENT DOCUMENTS 3,925,728 A * 12/1975 Whyte .......................... 324/142
4,117,530 A * 9/1978 Reed et al. .................. 361/660
4,491,790 A * 1/1985 Miller ......................... 324/142
6,015,314 A * 1/2000 Benfante ..................... 439/517

* cited by examiner

*Primary Examiner*—Jean F Duverne
(74) *Attorney, Agent, or Firm*—Jose de la Rosa

(57) ABSTRACT

The present invention relates generally to multi-position metering apparatus. More particularly, the invention encompasses a wire distributed 5th jaw system for multi-position metering. The present invention is also directed to a novel multi-position metering device with multiple optional 5th terminals. The invention further provides a way to use a single wire as potential to connect all 5th terminals in a multi-position metering device. A single wire with insulation, one end of which is connected to line neutral, is laid out to pass by all meter sockets through designated channel on each meter socket base. The single wire is then stripped on a specified area when it passes on each meter socket for electrical connection to a 5th terminal through a potential. Additionally, an inventive meter socket base has been designed to constraint the $5^{th}$ terminal distribution wire, 5th terminal potential, and the $5^{th}$ jaw sub-assembly, and to provide provisions for the 5th jaw sub-assembly to be installed in either a 6 O'clock position or a 9 O'clock position. This invention also encompasses a multiple wire relay distribution system between each individual meter socket. The present invention also provides an alternative way to use multiple wire with terminals chained together to connect all $5^{th}$ terminals in a multi-position metering device.

39 Claims, 6 Drawing Sheets

WIRE DISTRIBUTED 5TH JAW SYSTEM FOR MULTI-POSITION METERING

CROSS-REFERENCE TO RELATED APPLICATIONS

This application claims priority to and the benefit of U.S. provisional application No. 61/039,457, filed on Mar. 26, 2008, entitled "Wire Distributed 5th Jaw System For Multi-Position Metering," the entire disclosure of which provisional application is incorporated herein by reference.

TECHNICAL FIELD

The present invention relates generally to multi-position metering apparatus. More particularly, the invention encompasses a wire distributed 5th jaw system for multi-position metering. The present invention is also directed to a novel multi-position metering device with multiple optional 5th terminals. The invention further provides a way to use a single wire as potential to connect all 5th terminals in a multi-position metering device. A single wire with insulation, one end of which is connected to line neutral, is laid out to pass by all meter sockets through designated channel on each meter socket base. The single wire is then stripped on a specified area when it passes on each meter socket for electrical connection to a 5th terminal through a potential. Additionally, an inventive meter socket base has been designed to constrain the $5^{th}$ terminal distribution wire, 5th terminal potential, and the $5^{th}$ jaw sub-assembly, and to provide provisions for the 5th jaw sub-assembly to be installed in either a 6 O'clock position or a 9 O'clock position. This invention also encompasses a multiple wire relay distribution system between each individual meter socket. The present invention also provides an alternative way to use multiple wire with terminals chained together to connect all $5^{th}$ terminals in a multi-position metering device.

BACKGROUND ART

A typical electrical meter center includes a cabinet or enclosure having a plurality of meter socket assemblies. Each meter socket assembly includes a plate member to which the various components of the socket assembly are secured. Electrical power is supplied to the meter center by feeder buses. Feeder buses, which typically consist of three phase buses and a neutral, are electrically connected to the utility lines and typically extend horizontally from the cabinet or enclosure. Multiple (two or three) vertical supply buses are also electrically connected to the feeder buses within the enclosure or cabinet. Each meter socket assembly mounts a meter for each tenant circuit and electrically connects the meter to the feeder buses and the supply buses. Typically, the electrical connections between the meter and socket assembly are made by plug-in jaws which engage corresponding blade-like stabs or meter blade connectors on the meter. The use of the plug-in jaws within the meter socket and the corresponding blade-like stabs or meter blade connectors on the back of the meter permits the meter to be removed from the socket when servicing or replacement of the meter is desired.

Socket type electrical watt-hour meters are used to measure and indicate the amount of electrical power consumption in a residence, industry or business. Typically, a socket type watt-hour meter plugs into a meter socket using the blade-like stab or meter blade connector located on the watt-hour meter. The meter socket itself is mounted inside a meter base or a panel.

When the line power is delivered from a 3 phase wire system, a 5th jaw is used to calculate electrical angle. This is used to correct electrical power consumption factor for correctly metering electrical power consumption. Generally, as serving its purpose, using as reference for calculating electrical angle, a 5th terminal is only required to flow up to about 5 amp current from neutral connection. To be conservative, some utilities required a $5^{th}$ terminal being designed for a 30 amp current by using #10 AWG wires. In multiple meter devices, a neutral bus connecting neutral feeder is commonly used to distribute neutral current through multiple meter sockets to their $5^{th}$ terminals. There are also a few multiple meter devices using #10 AWG wires which connect directly from neutral feeder to all individual $5^{th}$ terminals with a home run connection.

This invention improves on the deficiencies of the prior art and provides an inventive wire distributed 5th jaw system for multi-position metering.

DISCLOSURE OF THE INVENTION

The invention is a novel wire distributed $5^{th}$ jaw system for multi-position metering. Therefore, one purpose of this invention is to provide a wire distributed 5th jaw system for multi-position metering. Another purpose of this invention is to provide a reliable solution to use a single wire connecting all 5th terminals. Yet another purpose of this invention is to provide a robust meter socket base to constrain the wire, 5th terminal and its potential, and to build-in features to provide either a 6 O'clock or a 9 O'clock position 5th terminal provision.

Therefore, in one aspect the present invention is directed to a meter center comprising at least one electrically non-conductive meter socket base that comprises two pairs of jaw assemblies wherein each jaw assembly comprises plug-in jaws to receive a corresponding stab of a watt-hour meter. The electrically non-conductive meter socket base further comprises a fifth jaw assembly removably connected to the electrically non-conductive meter socket base. The fifth jaw assembly comprises plug-in-jaws for receiving a corresponding stab of a watt-hour meter. The meter center further comprises a terminal member electrically connected to the plug-in-jaws of the fifth jaw assembly, and a neutral distribution conductor device for electrically connecting the terminal member to a neutral bus.

In another aspect, the present invention is directed to a meter socket base comprising an electrically non-conductive body and a bed surface channel formed on the electrically non-conductive body. The bed surface channel has a generally laterally extending first portion and a generally vertically extending second portion. The generally laterally extending first portion of the bed surface channel extends to a first region that defines a nine o'clock position and the generally vertically extending second portion of the bed surface channel extends downward to a second region that defines a six o'clock position. The electrically non-conductive body has a first hole within the bed surface channel and located at the first region and a second hole within the bed surface channel and located at the second region. Each hole is sized to receive a portion of a plug-in-jaw assembly. The meter socket base further comprises a conductor attachment member comprising a channel in communication with the generally laterally extending first portion of the bed surface channel. The channel of the conductor attachment member is generally orthogonal to the generally laterally extending first portion and sized to receive a portion of at least one conductor.

BRIEF DESCRIPTION OF THE DRAWINGS

Although the scope of the present invention is much broader than any particular embodiment, a detailed description of the preferred embodiment follows together with drawings. These drawings are for illustration purposes only and are not drawn to scale. Like numbers represent like features and components in the drawings. The invention may best be understood by reference to the ensuing detailed description in conjunction with the drawings in which.

BEST MODE OF CARRYING OUT THE INVENTION

Figure 1:
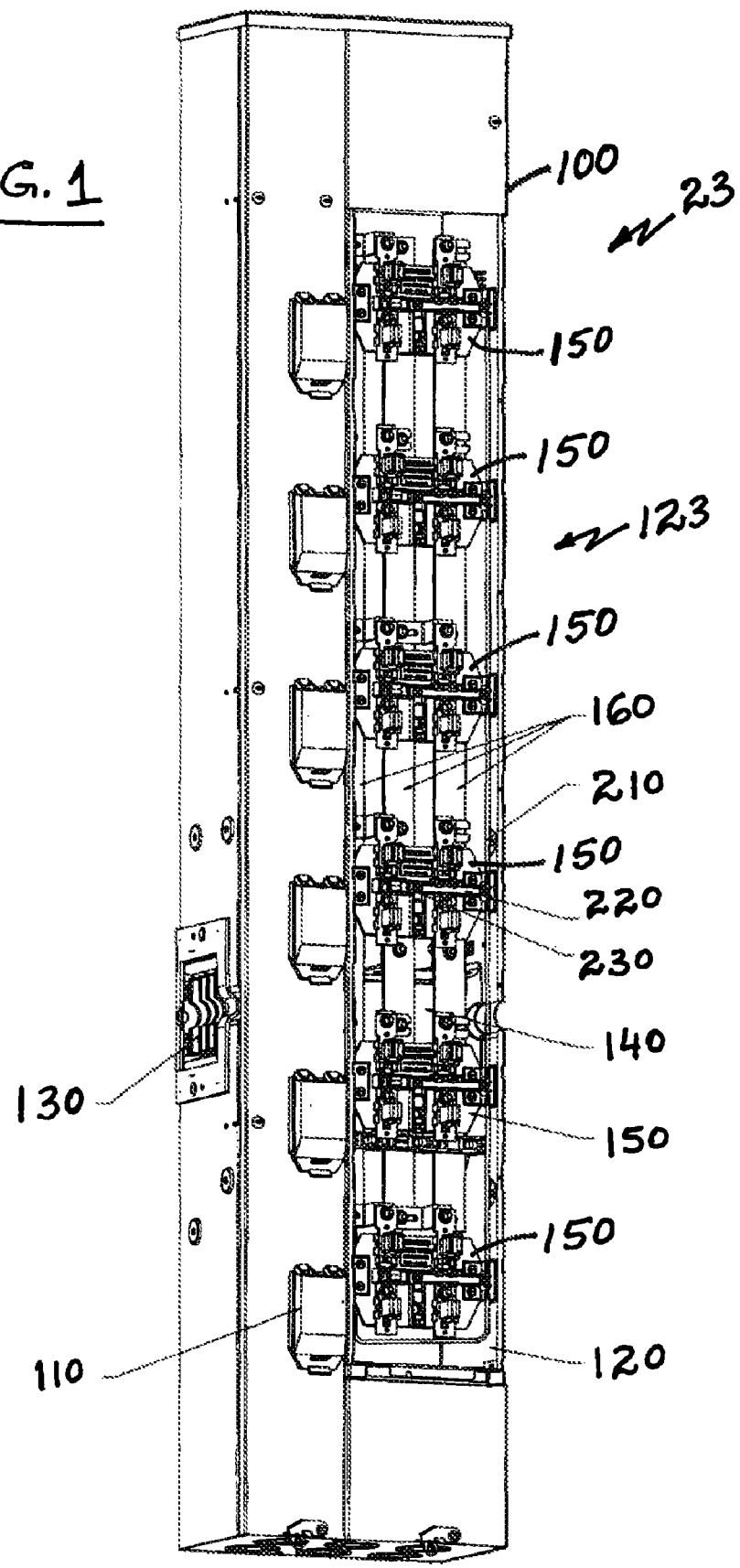
FIG. 1 illustrates a front view of the inventive wire distributed 5th jaw system for a 6 meter position enclosure.

FIG. 1 illustrates a front view of the inventive wire distributed 5th jaw system for a multi-position metering 23, having an inventive wire distributed 5th jaw system 123. The wire distributed 5th jaw system for a multi-position metering 23, is illustrated for a 6 meter position having an enclosure 100, however, this invention can be used for any multi-position metering system 23. The enclosure or cabinet 100 preferably has two compartments, a meter section 120, and a load section 110. The electrical current is led in on bus joint 130, through a single bolt joint (not shown) from a tap box (not shown) which are connected to busways or utility wires. The electrical current passes through the bus joint 130 to crossing buses 140 and to riser distribution buses 160 and then is delivered to individual meter sockets 150. The electrical current is delivered to load tenants through a watt-hour meter (not shown) that is plugged on the meter sockets 150 for consumption. When electrical currents come from 3 phase "Y" transformer, a multiple $5^{th}$ terminal potential 220 or a 5th jaw sub-assembly 230, that is connected to neutral is needed for traditional watt-hour meters to measure electrical power consumption. As shown in FIG. 1 the novel wire distributed 5th jaw system, which comprises of a single insulated wire 210 or a 5th terminal distribution wire 210, connected to line neutral at one end, as more clearly seen in FIG. 3, of a multiple 5th terminal potentials 220, and a 5th jaw sub-assembly 230.

Figure 2:
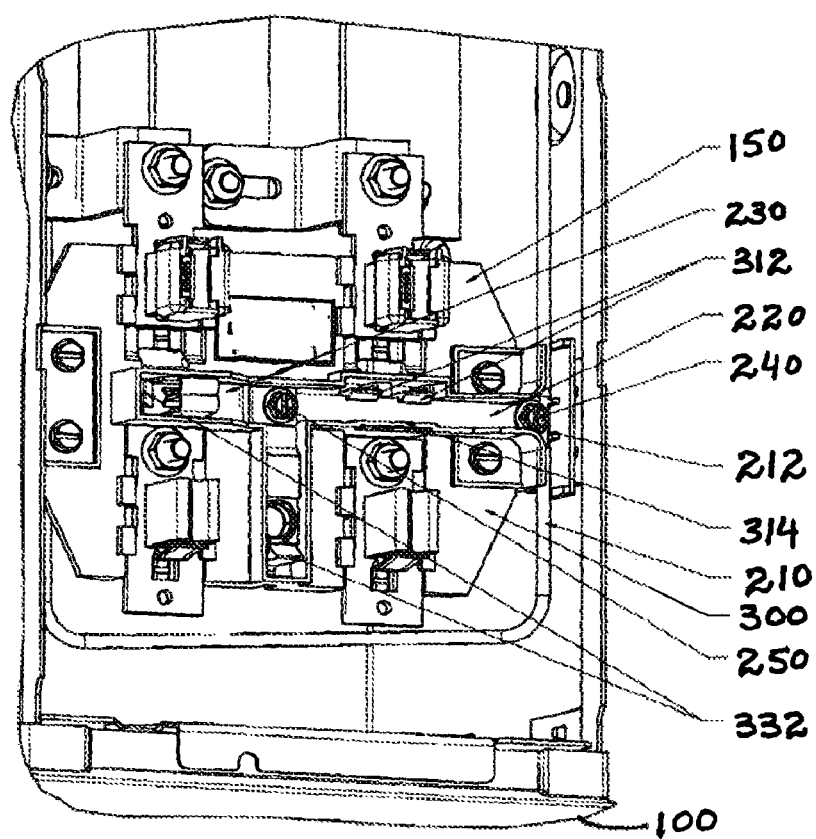
FIG. 2 is a detailed view showing a 5th terminal distribution wire passing by an individual meter socket and connecting to its 5th jaw sub-assembly.
Figure 7:
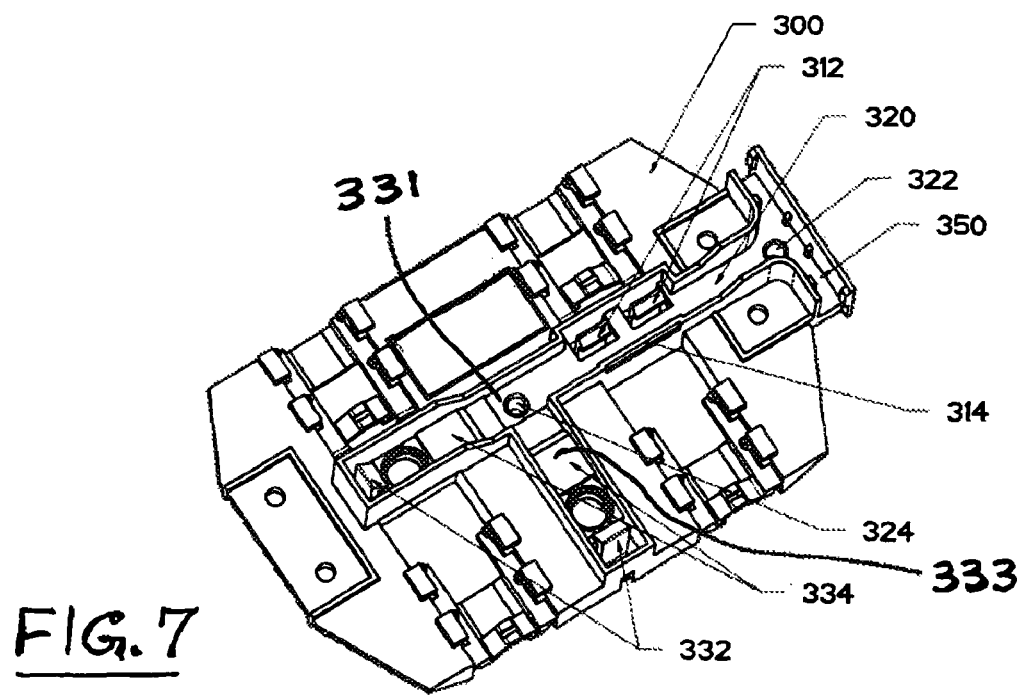
FIG. 7 illustrates an inventive meter socket base for constraining a 5th terminal distribution wire, a 5th terminal potential, and a 5th jaw sub-assembly.

FIG. 2 is a detailed view showing a 5th terminal distribution wire 210, passing by an individual meter socket 150, and connecting to its 5th jaw sub-assembly 230. The 5th terminal distribution wire 210 passes by the first meter socket 150 through a designated slot and stripped a portion 212 to bare copper wire for connecting to 5th terminal potential 220 by a wire binding screw 240. The 5th terminal potential 220 is constraint by two snapping features 312 and a lock feature 314 built-in meter socket 150 base 300. The inventive meter socket base 300, is more clearly described in FIG. 7. The $5^{th}$ jaw sub-assembly 230, is mounted to the individual meter socket 150, and is joined to the $5^{th}$ terminal potential 220, with at least one fastening device 250. In the preferred embodiment, the fastening device 250, is a screw 250. Others skilled in the art may select the fastening device 250, to be a clip, clamp, a rivet element, to name a few. The fastening device 250 may also include a standard bolt and a spring washer to secure the $5^{th}$ terminal potential 220, and the $5^{th}$ jaw sub-assembly 230, to the individual meter socket 150. On the other end of the 5th jaw sub-assembly 230, a snap feature 332, which is built-in meter socket base 300 firmly locks it in its 9 O'clock position as shown in FIG. 2, or in its 6 O'clock position as shown in FIG. 7. As shown in FIG. 2, the 6 O'clock position for the $5^{th}$ jaw sub-assembly 230, is vacant or empty, however, using the above-described process the $5^{th}$ jaw sub-assembly 230, could have easily been installed in its 6 O'clock position while leaving the 9 O'clock position vacant or empty.

Figure 3:
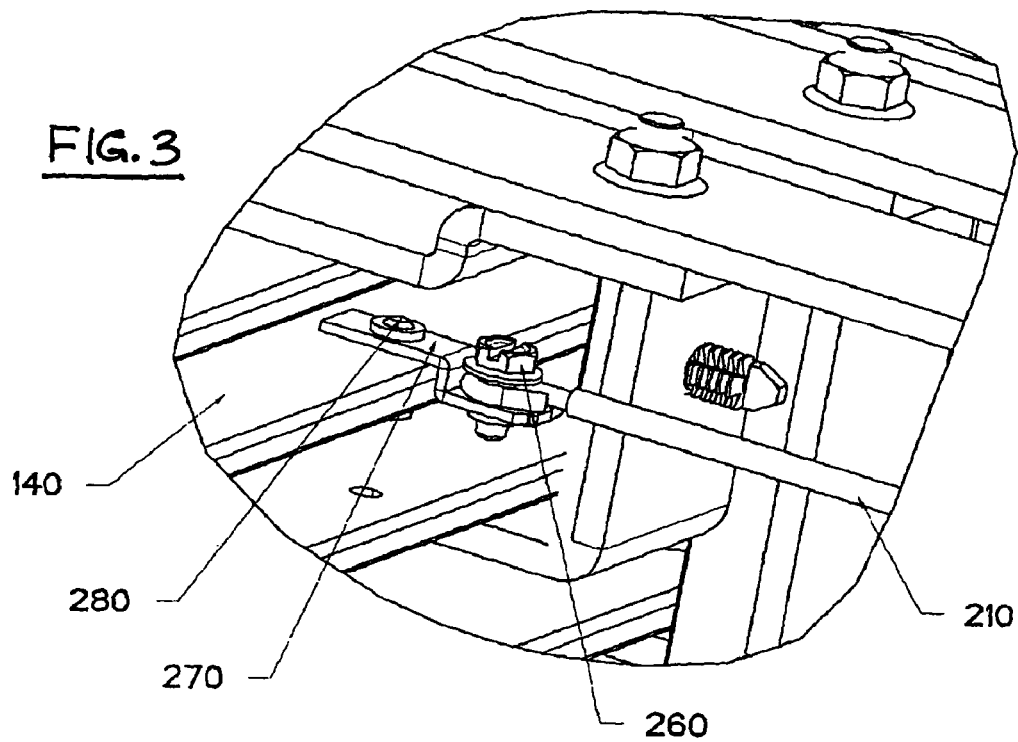
FIG. 3 is a detailed perspective view showing the 5th terminal distribution wire as connected to a line neutral.

FIG. 3 is a detailed perspective view showing the 5th terminal distribution wire 210, as connected to a line neutral 140. A wire terminal 270 is secured to line neutral 140 through at least one fastening device 280. The fastening device 280 could be selected from a group comprising a screw, a clip, clamp, a rivet element, to name a few. The attachment device 280 may also include a standard bolt and a spring washer. The 5th terminal distribution wire 210 is secured to the wire terminal 270 via at least one wire binding fasting device 260. The wire binding fastening device 260 could be selected from a group comprising a screw, a clip, clamp, a rivet element, to name a few. The wire binding attachment device 260 may also include a standard bolt and a spring washer.

Figure 4:
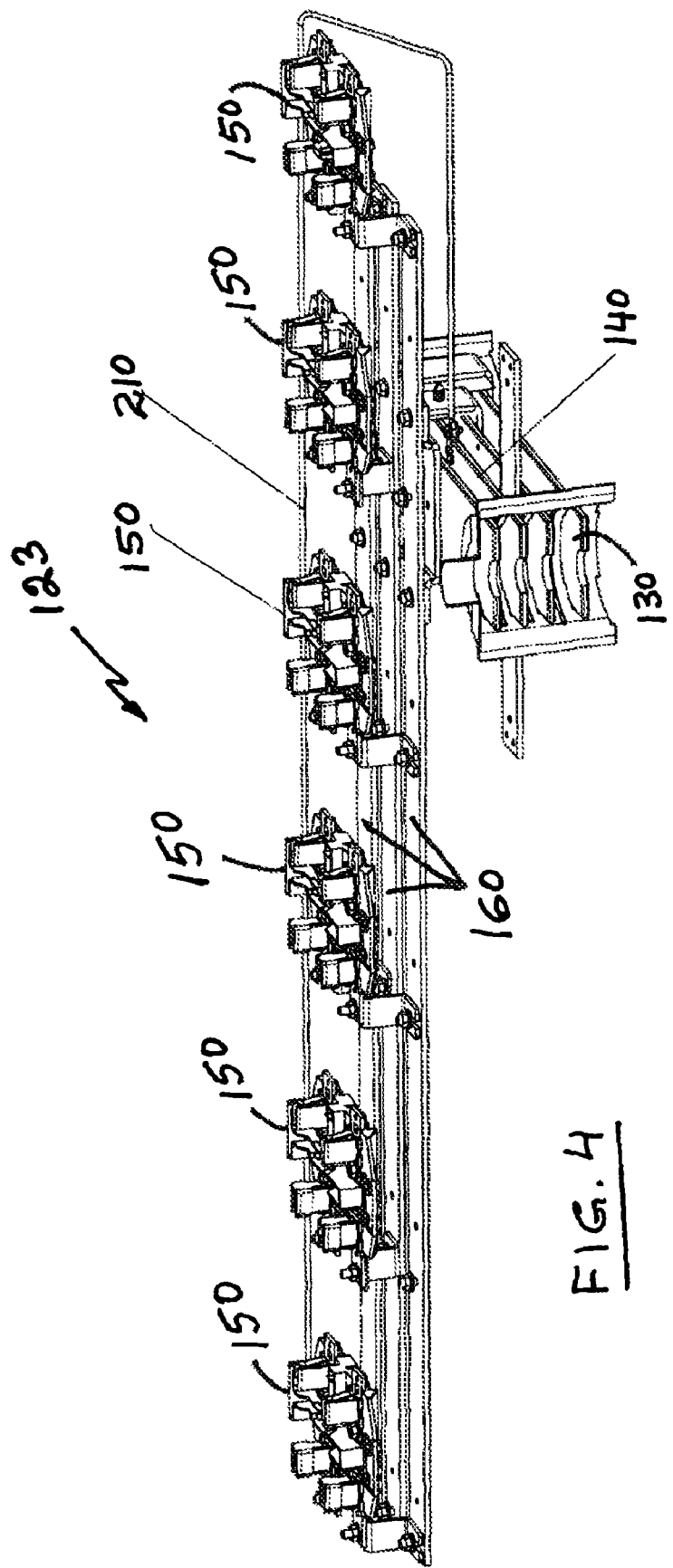
FIG. 4 is a detailed cut-away view of the inventive wire distributed 5th jaw system for a 6 meter position showing interior connections and where the enclosure and the covers have been removed.

FIG. 4 is a detailed cut-away view of the inventive wire distributed 5th jaw system 123, for a 6 meter position showing interior connections and where the enclosure and the covers have been removed. As one can see that the 5th terminal distribution wire 210, is connected from line neutral 140, on crossing buses to individual meter sockets 150, and joins the wire distributed 5th jaw system together.

Figure 5:
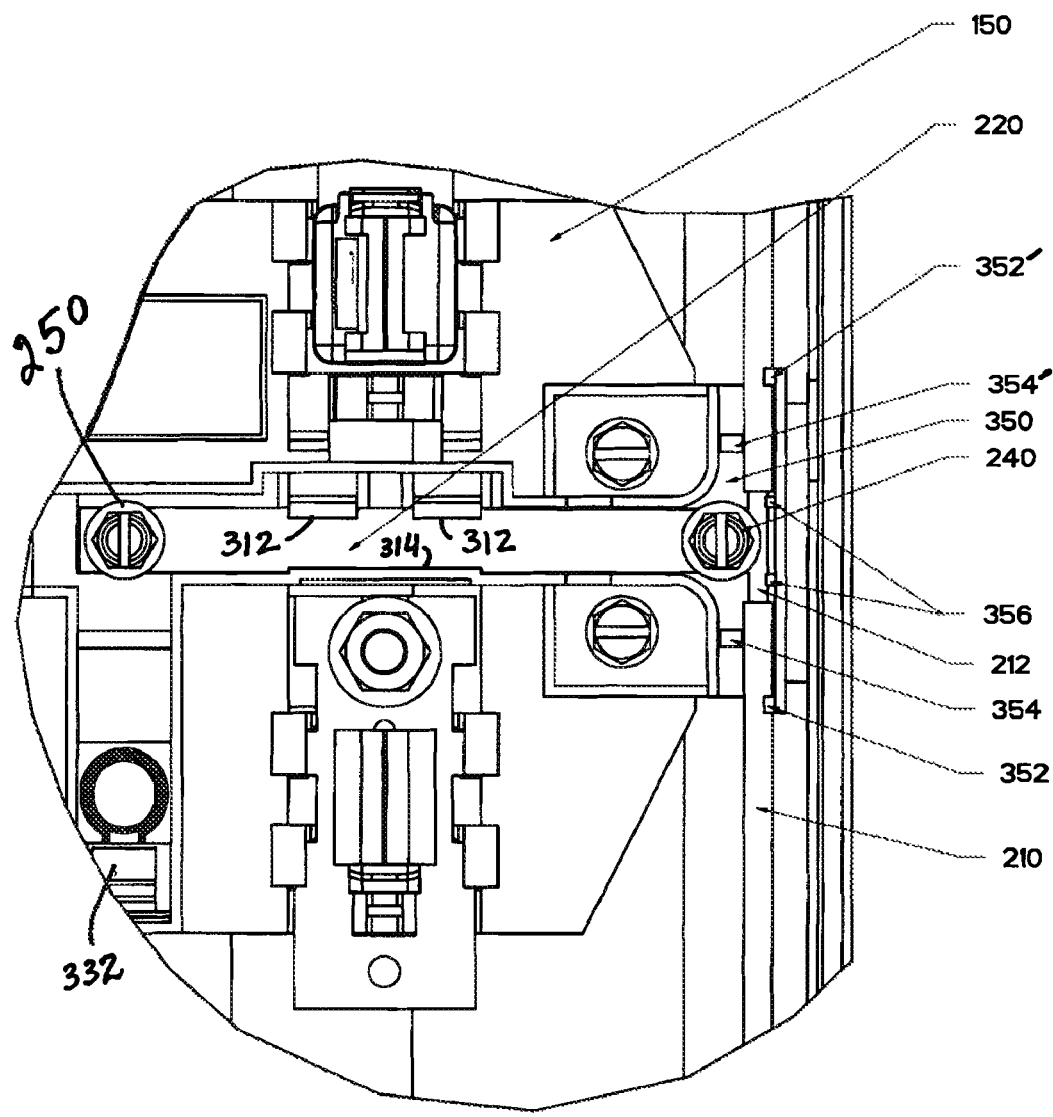
FIG. 5 is a detailed view of a 5th terminal distribution wire passing by an individual meter socket and connecting to its 5th jaw sub-assembly.

FIG. 5 is a detailed view of a 5th terminal distribution wire 210, passing by an individual meter socket 150 and connecting to its 5th jaw sub-assembly 230. FIG. 5 also shows the details of the 5th terminal distribution wire 210, which is connected to the 5th terminal potential 220. After the 5th terminal potential 220, is snapped onto the meter socket 150, the 5th terminal distribution wire 210, is pressed into the designated channel 350, on the meter socket 150 base. The meter socket base 300 preferably has at least one locating feature 352, and/or 352', and/or 354, and/or 354', which are preferably located on both side walls of the designated channel 350, to trap and secure the $5^{th}$ terminal distribution wire 210, within the channel 350. The meter socket base 300, preferably has at least one rib 356, that guides both sides of stripped area 212, of the $5^{th}$ terminal distribution wire 210, by making the stripped area 212, directly lay on the 5th terminal potential 220. The wire binding screw 240 provides a reliable binding on the electrical connection to electrically connect the stripped area 212, of the 5$^{th}$ terminal distribution wire 210, to the 5$^{th}$ terminal potential 220.

Figure 6:
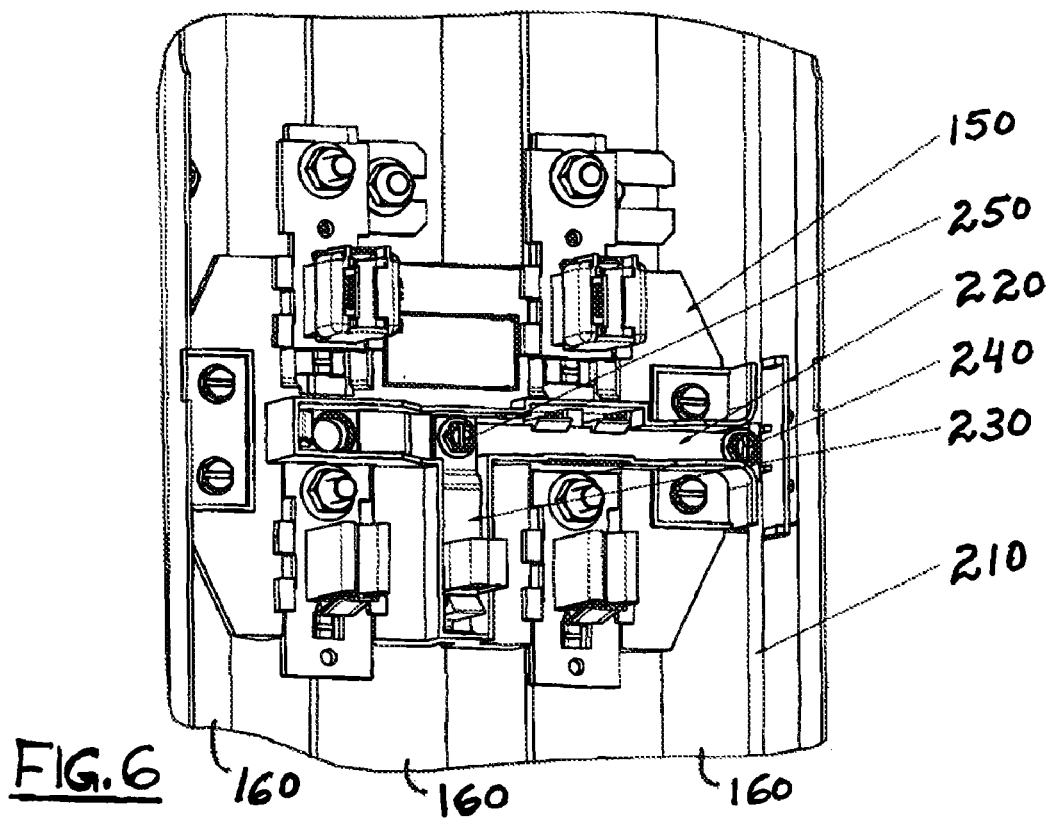
FIG. 6 is a detailed view illustrating a 5th jaw sub-assembly as installed in a 6 O'clock position.

FIG. 6 is a detailed view illustrating a 5th jaw sub-assembly 230, as installed in a 6 O'clock position.

FIG. 7 illustrates an inventive meter socket base 300, for constraining a 5th terminal distribution wire 210, a 5th terminal potential 220, and a 5th jaw sub-assembly 230.

The meter socket base 300 preferably has a wiring channel 350, which is connected to a bed surface channel 320. The bed surface channel 320 connects to bed surface channel 331 and bed surface channel 333. At each end of bed surface channel 331, and bed surface channel 333, is a snapping feature 332. The bed surface channel 320 preferably has at least one snapping feature 312. Preferably, the 5th terminal potential 220, is the first component of the wire distributed 5th jaw system installed onto the meter socket base 300. Locking feature 324 is designed to lock the 5th terminal potential 220, with a tight fit gap onto the bottom of the bed surface channel 320, for the 5th terminal potential 220. Initially, the 5th terminal potential 220, without the use of any securing devices, such as, side screws, is installed with one side edge of the 5$^{th}$ terminal potential 220, inserted into the lock feature 314, while the other or opposite edge of the 5th terminal potential 220, is laying flat on the snapping features 312. By pulling back the snapping features 312, or pressing firmly on the 5th terminal potential 220, the 5th terminal potential 220, is then locked into the bed surface channel 320, of the meter socket base 300. Furthermore, the locking feature or arm guide 314, along with the snapping feature 312, act as a locating and alignment guide for locating and securing the 5th terminal potential 220, to the watt hour meter socket 150. After the securing devices 240, 250, such as, for example, connection screws 240, 250, are installed, which fit in the relief or blind holes 322, 324, respectively, the fitting effects of the screws' 240, 250, body and the fitting holes 322, 324, constrain the freedom of the 5th terminal potential 220, from rotating loose out of the installation position within the bed surface channel 320. The 5th terminal distribution wire 210 is then passed through the wiring channel 350. The 5th jaw sub-assembly 230 can now be installed on top of the 5$^{th}$ terminal potential 220. The 5th jaw sub-assembly 230, is supported by contour features 334, and locked in place at one end by the snapping feature 332, while the other or opposite end is connected to the 5th terminal potential 220, by at least one fastening device 250, which is then secured inside the blind hole 324, of the meter socket base 300. It should be appreciated that the contour feature 334, help guide the alignments for the 5$^{th}$ jaw sub-assembly 230, into the bed surface channel 320, of the meter socket base 300, while the snapping feature 332, keep the 5$^{th}$ jaw sub-assembly 230, from moving out of its installed position. The meter socket base 300 is made from an electrically insulating material. The electrically insulating material for the meter socket base 300, could be selected from a group comprising, plastic, porcelain, ceramic, to name a few. The meter socket base 300 could also be made using various molding methods which are well know to people skilled in the art. As one can appreciate that with these features and component combination one provides a robust and a reliable installation of the 5$^{th}$ terminal potential 220, to an individual meter socket 150.

Figure 8A:
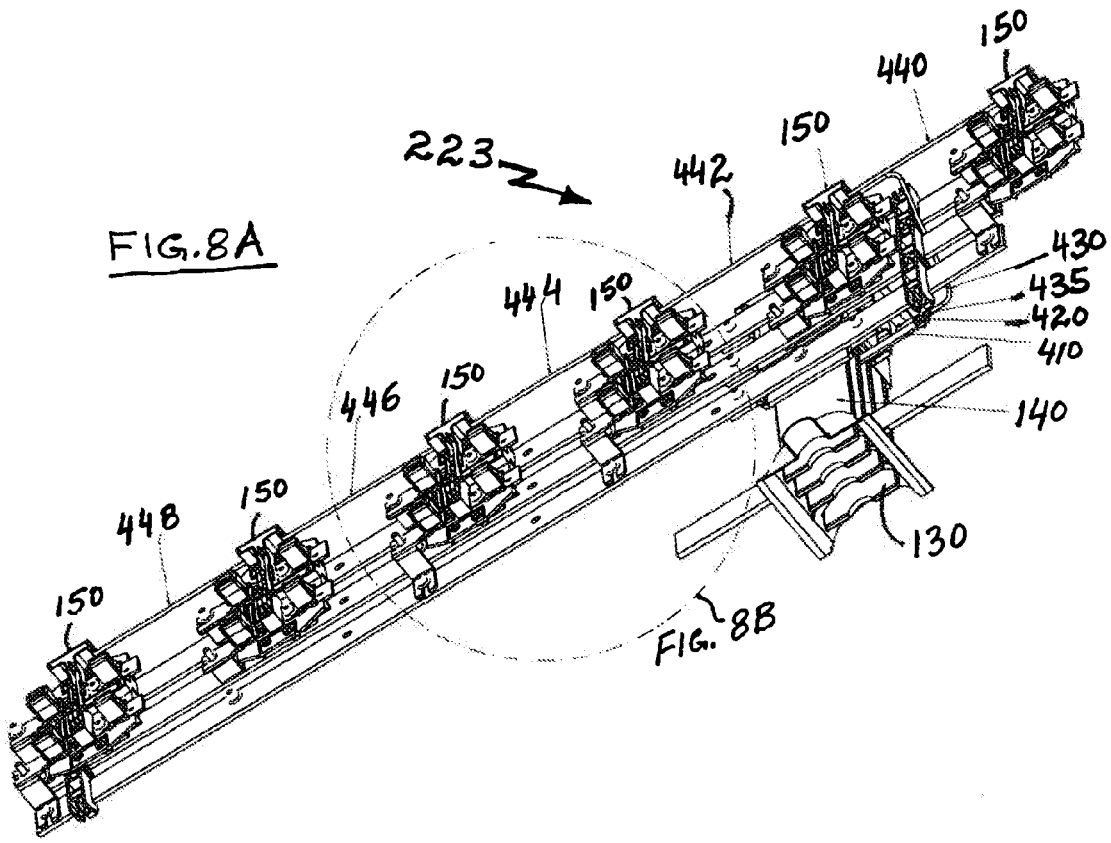
FIG. 8A is a detailed cut-away view of an alternate embodiment of an inventive wire distributed 5th jaw system for a 6 meter position showing interior connections and where the enclosure and the covers have been removed.
Figure 8B:
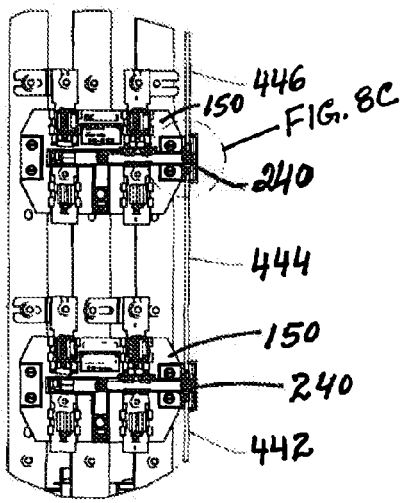
FIG. 8B is a detailed enlarged view of a portion of the alternate embodiment shown in FIG. 8A.
Figure 8C:
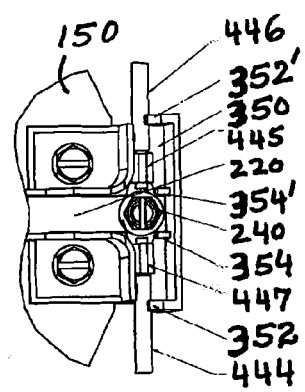
FIG. 8C is a detailed enlarged view of a portion of the alternate embodiment shown in FIG. 8B.

FIG. 8A is a detailed cut-away view of an alternate embodiment of an inventive wire distributed 5th jaw system 223, for a 6 meter position showing interior connections and where the enclosure and the covers have been removed. FIG. 8B is a detailed enlarged view of a portion of the alternate embodiment shown in FIG. 8A, and FIG. 8C is a detailed enlarged view of a portion of the alternate embodiment shown in FIG. 8B. As stated earlier FIGS. 8A, 8B and 8C illustrate another wire distribution option for a 5th jaw system for multi-position metering. This embodiment is similar to the one illustrated in FIG. 4, but there are several differences, one of the main difference is that the wire for connecting the individual meter sockets 150, has terminals at both ends and is fastened by one wire binding screw 240, and relay to another individual meter socket 150, by using one wire assembly multiple locations, whereas the embodiment illustrated in FIG. 4 utilizes a single 5$^{th}$ terminal distribution wire 210.

As shown in FIG. 8A, the 5$^{th}$ jaw system 223, is connected to a neutral connection bar 410, through a bended wire 430, with terminals on both ends. One end terminal of the bended wire 430 is fastened by a fastening device 435, such as, a screw 435, to the neutral connection bar 410. The neutral connection bar 410, can be fastened or welded to the crossing bus 140 neutral, and through the neutral connection bar 410, the 5th jaw system is connected to crossing bus 140 neutral via bended wire 430. The other end terminal of the bended wire 430 is fastened with terminals of wire 440 and 442 to the nearest 5th jaw potential 220. Then through wire 440, 442, 444, 446, and 448, all meter positions' 5 jaws are connected and home to the crossing bus 140 neutral. The detail views show have the connections is joined together and detail features on the wire channel 450 keep the wires constraint.

FIG. 8B is a detailed enlarged view of a portion of the alternate embodiment 223, shown in FIG. 8A. Wire binding screw 240, secures the bare terminal portion of the wire 442, 444, 446, to each individual meter socket 150.

FIG. 8C is a detailed enlarged view of a portion of the alternate embodiment 223, shown in FIG. 8B. FIG. 8C is similar to FIG. 5, except it is for the alternate embodiment 223, illustrated in FIG. 8A and FIG. 8B. The 5th terminal distribution wire 444, 446, having a bare terminal end 447, 445, respectively, passes an individual meter socket 150, and is connected to its 5th jaw sub-assembly 230, as more clearly shown in FIG. 6. The 5th terminal distribution wire 444, 446, is connected to the 5$^{th}$ terminal potential 220. After the 5th terminal potential 220, is snapped onto the meter socket 150, the 5th terminal distribution wire 444, 446, is pressed in a designated channel 450, on the meter socket 150 base. The meter socket base 300, preferably has at least one locating feature 352, and/or 352', and/or 354, and/or 354', which can be on either side of the side wall of the designated channel 350, but is preferably located on both side walls of the designated channel 350, to trap and secure the 5$^{th}$ terminal distribution wire 444, 446, within the channel 350. The meter socket base 300, preferably has at least one rib 356, that guides both sides of stripped wire area 445, 447, of the 5$^{th}$ terminal distribution wire 446, 444, respectively, by making the stripped wire area 445, 447, directly lay on the 5th terminal potential 220. The wire binding screw 240, provides a reliable binding on the electrical connection to electrically connect the stripped area 445, 447, of the 5$^{th}$ terminal distribution wire 446, 444, respectively, to the 5$^{th}$ terminal potential 220.

Referring to FIGS. 8A, 8B and 8C, this invention one can have a single or multiple wire relay distribution system between each individual meter socket 150. As shown in FIG. 8A that multiple wires 440, 442, 444, 446 and 448, with individual terminals are chained together to connect all 5$^{th}$ terminals in the multi-position metering device 223. For example, as shown in FIG. 8C, the wire 444, has a bare terminal end 447, which is secured to the 5$^{th}$ terminal potential 220, via the wire binding screw 240. Similarly, the wire 446, having a bare terminal end 445, is secured to the 5$^{th}$ terminal potential 220, via the wire binding screw 240. With this alternate embodiment one can use smaller or a uniform section of wires to connect all 5$^{th}$ terminals in the multi-position metering device 223.

While the present invention has been particularly described in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A meter center, comprising:
    at least one electrically non-conductive meter socket base comprising two pairs of jaw assemblies, each jaw assembly comprising plug-in jaws to receive a corresponding stab of a watt-hour meter, the meter socket base further including a fifth jaw assembly removably connected to the meter socket base and comprising plug-in-jaws for receiving a corresponding stab of a watt-hour meter;
    a terminal member electrically connected to the plug-in-jaws of the fifth jaw assembly; and
    a single wire neutral distribution system as a neutral distribution conductor device for electrically connecting the terminal member to a neutral bus.

2. The meter center according to claim 1 further comprising a cabinet having an interior and wherein the at least one electrically non-conductive meter socket base is attached to the cabinet and located within the interior of the cabinet.

3. The meter center according to claim 1 wherein the at least one electrically non-conductive meter socket base comprises a plurality of electrically non-conductive meter socket bases attached to the cabinet, and wherein the single wire neutral distribution system is electrically connected to the terminal member of each electrically non-conductive meter socket base.

4. The meter center according to claim 1 wherein each electrically non-conductive meter socket base further comprises:
    a conductor attachment device comprising a channel sized to receive a portion of the single wire neutral distribution system; and
    a device to secure the portion of the single wire neutral distribution system inside the channel and electrically connect the single distribution wire to the terminal member.

5. The meter center according to claim 4 wherein the conductor attachment device comprises at least one locating feature to trap and secure the portion of the single wire neutral distribution system within the channel.

6. The meter center according to claim 5 wherein the single wire neutral distribution system includes an insulation jacket that has a plurality of stripped portions wherein each stripped portion exposes a portion of the wire, and wherein each exposed portion is located within the channel of the conductor attachment device and secured therein by the at least one locating feature.

7. The meter center according to claim 4 wherein the electrically non-conductive meter socket base further includes a bed surface channel and wherein the terminal member is located within and attached to the bed surface channel.

8. The meter center according to claim 7 wherein conductor attachment device is at a three o'clock position on the electrically non-conductive meter socket base and the bed surface channel is contiguous with the channel of the conductor attachment device.

9. The meter center according to claim 7 further comprising a fastening device to retain the terminal member within the bed surface channel.

10. The meter center according to claim 7 wherein the bed surface channel has a generally laterally extending first portion and a generally vertically extending second portion.

11. The meter center according to claim 10 wherein the generally laterally extending first portion of the bed surface channel extends to a first region that defines a nine o'clock position and the generally vertically extending second portion of the bed surface channel extends downward to a second region that defines a six o'clock position.

12. The meter center according to claim 11 wherein the terminal member has a generally laterally extending first section that is within the generally laterally extending first portion of the bed surface channel.

13. The meter center according to claim 12 wherein the terminal member includes a generally vertically extending second section that is within the generally vertically extending second portion of the bed surface channel.

14. The meter center according to claim 12 wherein the electrically non-conductive meter socket base includes a hole that is located at the first region within the bed surface channel, wherein a portion of the plug-in-jaws of the fifth jaw assembly is disposed in the hole.

15. The meter center according to claim 14 wherein the electrically non-conductive meter socket base further comprises a resilient member that is adjacent to the first region and which abuts and frictionally contacts the plug-in-jaws of the fifth jaw member so as to keep the plug-in-jaws connected to the meter socket base.

16. The meter center according to claim 12 wherein the electrically non-conductive meter socket base includes a hole at the second region within the bed surface channel, the hole being sized to receive at least a portion of the plug-in-jaws of the fifth jaw assembly.

17. The meter center according to claim 16 wherein the at least one electrically non-conductive meter socket base further comprises a resilient member that is adjacent to the second region and which abuts and frictionally contacts the plug-in-jaws of the fifth jaw member so as to keep the plug-in-jaws connected to the meter socket base.

18. The meter center according to claim 1 wherein the at least one electrically non-conductive meter socket base comprises a plurality of electrically non-conductive meter socket bases attached to the cabinet, and wherein the single wire neutral distribution system comprises a plurality of single wire neutral distribution systems wherein the terminal members of any consecutive pair of meter socket bases are electrically connected together by a corresponding single wire neutral distribution system, and wherein each meter socket base further comprises a conductor attachment device that comprises a channel that is sized for receiving the end of at least one single wire neutral distribution system, and a device to secure the end of the at least one single wire neutral distribution system within the channel and electrically connect the end of the at least one single wire neutral distribution system to the terminal member.

19. A meter socket base comprising:
    a electrically non-conductive body:
    a bed surface channel formed on the electrically non-conductive body, the bed surface channel having a generally laterally extending first portion and a generally vertically extending second portion, wherein the generally laterally extending first portion of the bed surface channel extends to a first region that defines a nine o'clock position and the generally vertically extending second portion of the bed surface channel extends downward to a second region that defines a six o'clock position;

said electrically non-conductive body having a first hole that is within the bed surface channel and located at the first region and a second hole that is within the bed surface channel and located at the second region, each hole being sized to receive a portion of a plug-in-jaw assembly; and a conductor attachment member comprising a channel in communication with the generally laterally extending first portion of the bed surface channel, the channel of the conductor attachment member being generally orthogonal to the generally laterally extending first portion and sized to receive a portion of at least one conductor.

20. The meter socket base according to claim 19 further comprising an electrically conductive terminal member located within the bed surface channel.

21. The meter socket base according to claim 20 further comprising at least one resilient locking member attached to the electrically non-conductive body and located within the bed surface channel for retaining the electrically conductive terminal member within the bed surface channel.

22. The meter socket base according to claim 21 further comprising a device configured to secure a conductor within the channel of the conductor attachment member and electrically connect the terminal member to the conductor.

23. The meter socket base according to claim 21 wherein the conductor attachment member includes locating members to facilitate placement of the conductor within the channel of the conductor attachment member.

24. The meter socket base according to claim 19 further comprising a pair of resilient members that are attached to the electrically non-conductive body, one of the resilient members being located at the first region near the first hole, the other resilient member being located at the second region and near the second resilient member, each resilient member being configured to abut and frictionally contact a plug-in-jaw.

25. A meter center, comprising:
at least one electrically non-conductive meter socket base comprising two pairs of jaw assemblies, each jaw assembly comprising plug-in jaws to receive a corresponding stab of a watt-hour meter, the meter socket base further including a fifth jaw assembly removably connected to the meter socket base and comprising plug-in-jaws for receiving a corresponding stab of a watt-hour meter;

a terminal member electrically connected to the plug-in-jaws of the fifth jaw assembly; and a multiple wire relay distribution system as neutral distribution conductor device for electrically connecting the terminal member to a neutral bus.

26. The meter center according to claim 25 wherein the at least one electrically non-conductive meter socket base comprises a plurality of electrically non-conductive meter socket bases attached to the cabinet, and wherein the multiple wire relay distribution system comprises a plurality Of separate wires wherein the terminal members of any consecutive pair of meter socket bases are electrically connected together by a single one of the plurality of separate wires, and wherein each meter socket base further comprises a conductor attachment device that comprises a channel that is sized for receiving the respective ends of two separate wires, and a device to secure the ends of the separate wires within the channel and electrically connect the ends of the separate wires to the terminal member.

27. The meter center according to claim 26 wherein each electrically non-conductive meter socket base further comprises:
a conductor attachment device comprising a channel sized to receive end portions of two separate wires; and
a device to secure the end portions of the separate wires and electrically connect the end portions of the separate wires to the terminal member.

28. The meter center according to claim 27 wherein the conductor attachment device comprises at least one locating feature to trap and secure the end portions of the separate wires within the channel.

29. The meter center according to claim 27 wherein each electrically non-conductive meter socket base further includes a bed surface channel and wherein the terminal member is located within and attached to the bed surface channel.

30. The meter center according to claim 29 wherein conductor attachment device is at a three o'clock position on the electrically non-conductive meter socket base and the bed surface channel is contiguous with the channel of the conductor attachment device.

31. The meter center according to claim 29 further comprising a fastening device to retain the terminal member within the bed surface channel.

32. The meter center according to claim 29 wherein the bed surface channel has a generally laterally extending first portion and a generally vertically extending second portion.

33. The meter center according to claim 32 wherein the generally laterally extending first portion of the bed surface channel extends to a first region that defines a nine o'clock position and the generally vertically extending second portion of the bed surface channel extends downward to a second region that defines a six o'clock position.

34. The meter center according to claim 33 wherein the terminal member has a generally laterally extending first section that is within the generally laterally extending first portion of the bed surface channel.

35. The meter center according to claim 34 wherein the terminal member includes a generally vertically extending second section that is within the generally vertically extending second portion of the bed surface channel.

36. The meter center according to claim 33 wherein the electrically non-conductive meter socket base includes a hole that is located at the first region within the bed surface channel, wherein a portion of the plug-in-jaws of the fifth jaw assembly is disposed in the hole.

37. The meter center according to claim 36 wherein the electrically non-conductive meter socket base further comprises a resilient member that is adjacent to the first region and which abuts and frictionally contacts the plug-in-jaws of the fifth jaw member so as to keep the plug-in-jaws connected to the meter socket base.

38. The meter center according to claim 33 wherein the electrically non-conductive meter socket base includes a hole at the second region within the bed surface channel, the hole being sized to receive at least a portion of the plug-in-jaws of the fifth jaw assembly.

39. The meter center according to claim 38 wherein the at least one electrically non-conductive meter socket base further comprises a resilient member that is adjacent to the second region and which abuts and frictionally contacts the plug-in-jaws of the fifth jaw member so as to keep the plug-in-jaws connected to the meter socket base.

* * * * *